United States Patent [19]

Krechmery et al.

[11] Patent Number: 4,765,188
[45] Date of Patent: Aug. 23, 1988

[54] PRESSURE TRANSDUCER WITH INTEGRAL DIGITAL TEMPERATURE COMPENSATION

[75] Inventors: Roger L. Krechmery; Mark D. Finefrock, both of Riverside, Calif.

[73] Assignee: Bourns Instruments, Inc., Riverside, Calif.

[21] Appl. No.: 933,966

[22] Filed: Nov. 24, 1986

[51] Int. Cl.[4] .......................... G01L 7/08; G01L 9/06; G01L 19/04
[52] U.S. Cl. ........................... 73/708; 73/721; 73/727; 338/3; 338/4; 364/558; 364/571
[58] Field of Search .................. 73/708, 720, 721, 726, 73/727, 4 R; 338/4, 6, 8, 10, 3; 374/143; 364/557, 558, 571

[56] References Cited

U.S. PATENT DOCUMENTS

| | | | |
|---|---|---|---|
| 3,646,815 | 3/1972 | Martin et al. | 73/398 AR |
| 3,841,150 | 10/1974 | Pearson | 73/88.5 R |
| 4,195,349 | 3/1980 | Balkanli | 374/143 |
| 4,196,382 | 4/1980 | Bryzek | 323/75 A |
| 4,213,348 | 7/1980 | Reinertson et al. | 73/765 |
| 4,226,125 | 10/1980 | Waugh | 73/708 |
| 4,320,664 | 3/1982 | Rehn et al. | 73/708 |
| 4,321,832 | 3/1982 | Runyan | 73/708 |
| 4,322,977 | 4/1982 | Sell et al. | 73/701 |
| 4,399,515 | 8/1983 | Gross | 73/714 |
| 4,446,527 | 5/1984 | Runyan | 364/558 |
| 4,449,409 | 5/1984 | Antonazzi | 73/724 |
| 4,532,809 | 8/1985 | Antonazzi et al. | 73/701 |
| 4,592,002 | 5/1986 | Bozarth, Jr. et al. | 364/571 |
| 4,598,381 | 7/1986 | Cucci | 364/558 |

Primary Examiner—Donald O. Woodiel
Attorney, Agent, or Firm—Howard J. Klein; William G. Becker

[57] ABSTRACT

A pressure transducer of the type employing a pressure-responsive diaphragm (11) with silicon piezoresistive strain gauges epitaxially deposited thereon is provided with integral digital thermal compensation of span shift and zero shift. The strain gauges are connected in a bridge circuit (30), and a differential voltage across the bridge circuit is amplified by an instrumentation amplifier (46). A temperature sensitive resistor (36) is deposited on the pressure-responsive diaphragm. This resistor is connected in a bridge circuit (35) the output of which is connected to an analog-to-digital (A/D) converter (54) which generates a digital number corresponding to the measured temperature of the piezoresistive strain gauges. This digital number is used to address pre-programmed correction data stored in a programmable read only memory (PROM) (53). The numerical correction data from the PROM is converted by a digital-to-analog (D/A) converter (55) to an analog correction signal. The D/A converter has two outputs which are alternately selected by a timing and control circuit (56) to provide thermal span shift and thermal zero shift correction signals. The thermal span shift signal is used to modify the excitation voltage of the piezoresistive strain gauge bridge circuit, while the thermal zero shift signal is added to the amplified voltage output of the bridge circuit. A simple analog circuit (58) provides linearity compensation.

8 Claims, 3 Drawing Sheets

PRESSURE TRANSDUCER WITH INTEGRAL DIGITAL TEMPERATURE COMPENSATION

BACKGROUND OF THE INVENTION

1. Field of the Invention

The subject invention generally relates to pressure transducers of the type employing a pressure-responsive diaphragm with silicon piezoresistive strain gauges epitaxially deposited thereon and, more particularly, to transducers of this type which employ integral digital temperature compensation for variation of the resistances and piezoresistivity of the strain gauges as a function of temperature.

2. Description of the Prior Art

Pressure transducers are known which are constructed by epitaxially depositing silicon piezoresistive strain gauges on a pressure responsive diaphragm. The piezoresistive strain gauges are generally, although not always, electrically connected in a bridge circuit such as a Wheatstone bridge. The voltage unbalance sensed across the bridge circuit is a measure of the pressure induced deflection of the diaphragm on which the strain gauges are deposited. The piezoresistive strain gauges are, however, subject to variations in resistance values and piezoresistivity characteristics due to changes in temperature for which compensation must be made in order to provide precise and accurate pressure measurements.

Temperature compensation has been provided in prior art silicon pressure transducers. For example, U.S. Pat. No. 3,646,815 to Martin et al discloses a transducer circuit including an L-type resistance bridge formed of a piezoresistor and a second resistor diffused into the diaphragm. The second transducer is insensitive to pressure and is connected to a temperature compensation circuit that provides outputs used to rebalance an amplifier and thereby make the measure of pressure insensitive to any changes in resistance values due to changes in temperature.

Other examples of temperature compensation of strain gauge pressure transducers are shown, for example, in U.S. Pat. No. 3,841,150 to Pearson and U.S. Pat. No. 4,196,382 to Bryzek. Both of these patents and the Martin et al. patent may be characterized as showing pressure transducers using exclusively analog circuitry. Since the measurement of such quantities as pressure, temperature and the like generally require a continuous output, the use of analog circuitry has been the obvious choice for transducers which measure such quantities. However, digital integrated circuits offer several advantages over traditional analog circuitry. These include miniaturization, lower cost, lower power requirements, and greater insensitivity to environmental conditions. Because of the discrete nature of digital signals, they are not directly usable in most transducer applications. In order to take advantage of the superior characteristics of digital circuitry, circuits have been developed which comprise a combination of analog and digital circuitry in an effort to maximize performance and minimize cost.

Examples of pressure transducers using a combination of analog and digital circuitry are shown, for example, in U.S. Pat. No. 4,321,832 to Runyan, U.S. Pat. No. 4,446,527 to Runyan, U.S. Pat. No. 4,592,002 to Bozarth, Jr., et al., and U.S. Pat. No. 4,598,381 to Cucci. The two patents to Runyan show a pressure transducer connected to analog signal processing circuitry. The output of the analog signal processing circuitry is connected to an analog-to-digital (A/D) converter, and both the analog signal processing circuitry and the A/D converter are controlled by a digital computer. Bozarth, Jr., et al. disclose a pressure transducer which provides its signal directly to an A/D converter the output of which is supplied to a digital computer. In this case, the signal processing is by the digital computer and not analog circuitry, and the digital signal processing includes compensation for temperature variations. Cucci discloses a differential pressure sensor where, again, signal processing is by a digital computer.

U.S. Pat. No. 4,320,664 to Rehn et al. discloses a thermally compensated silicon pressure sensor which, as best shown in FIG. 7, employs an A/D converter for supplying data to a microprocessor. This data includes temperature data as well as pressure data. Rehn et al. employ a read only memory (ROM) which stores compensation data. The Rehn et al. patent provides a good explanation of the need for thermal correction of a silicon strain gauge for the piezoresistivity parameter. U.S. Pat. No. 4,226,125 to Waugh also discloses a pressure sensor system which uses a microprocessor and a ROM. However, the use of a digital computer or a microprocessor is generally not justified for most transducer applications and adds considerably to the complexity of the system requiring software as well as hardware design.

Examples of pressure sensors employing a combination of analog and digital circuitry but not a digital computer or microprocessor are shown in U.S. Pat. No. 4,322,977 to Sell et al., U.S. Pat. No. 4,449,409 to Antonazzi and U.S. Pat. No. 4,532,809 to Antonazzi et al. Each of these patents discloses pressure transducers of the capacitive type as opposed to piezoresistive strain gauges; however, the signal processing circuitry of these patents include the use of analog-to-digital (A/D) and digital-to-analog (D/A) converters and temperature compensation of the measured pressure signal.

While the approaches taken in the prior art have generally been successful in terms of providing relatively precise and accurate temperature compensated pressure measurements, there is still a need for a simpler, more cost effective pressure transducer.

SUMMARY OF THE INVENTION

It is therefore an object of the present invention to provide a temperature compensated pressure transducer of the type employing a pressure-responsive diaphragm with strain gauges which is capable of precise and accurate pressure measurements and yet is less expensive to produce than prior art transducers of similar precision and accuracy.

It is another object of the invention to provide a pressure transducer which may be configured as either an absolute pressure transducer or a differential pressure transducer and which makes use of digital circuitry to provide thermal zero shift and thermal span shift compensation.

It is a further object of the invention to provide a pressure transducer with integral digital temperature compensation for the variation of resistances of piezoresistive strain gauges as well as analog linearity compensation.

It is yet another object of the invention to provide a pressure transducer having digital temperature compensation for piezoresistivity changes of the strain gauges used in the transducer.

According to a preferred embodiment of the invention, epitaxially deposited silicon piezoresistive strain gauges are deposited on a pressure-responsive diaphragm in a Wheatstone bridge configuration. An additional silicon resistor deposited on the diaphragm is responsive only to temperature. This temperature sensor resistor is connected into a second bridge circuit with three other resistors in a separate circuit. The output of the second or temperature bridge circuit is fed to an A/D converter, the output of which addresses a programmable read only memory (PROM) containing thermal error correction data. The PROM and its associated circuitry correct for thermal zero shift and thermal span shift. Thermal zero and span shifts are corrected by the data stored in the PROM, while linearity errors are corrected by analog circuitry. A digital-to-analog (D/A) converter receives selected digital data read out of the PROM, depending on whether span or zero correction is being made. The D/A converter has two outputs; the analog span shift correction signal that modifies the voltage driving the pressure bridge and an analog zero shift correction signal that is summed with the pressure bridge output signal. A timing and control circuit alternately selects the data output from the PROM and switches the D/A converter output between the two outputs.

The subject invention accomplishes the thermal correction for the piezoresistivity parameter in a much simpler, more direct yet still accurate way than the prior art. One of the advantages of the invention is that the digital correction is made without interruption of the analog output, thus offering continuous signal output which does not have to be synchronized with the output monitoring devices. The zero offset correction is derived from the same A/D, PROM and D/A circuitry as is the piezoresistivity correction. Further, the correction signal is supplied directly to the Wheatstone bridge supply potential for the purpose of compensating for the output span change, resulting from a piezoresistivity change due to thermal environmental changes. The invention has eliminated the digital computer or microprocessor which is required in the prior art devices such as are disclosed in the patents to Rehn et al. and Waugh where temperature is sensed and a ROM is accessed for thermal correction data.

According to the preferred, and most accurate, implementation of the invention, the contents of each transducer's PROM contents are determined individually. The method of calibrating the PROM of a transducer requires first the replacement of the PROM for that transducer with a ROM simulator which is computer controlled. With the transducer circuit activated and a precision pressure source connected to the sensor, the transducer's thermal environment is slowly changed from one specified extreme to another. As the temperature sensing resistor, through the differential A/D converter, addresses each new ROM correction, the computer responds with a successive approximation of simulated ROM outputs until the ideal null and span correction numbers are achieved as measured at the transducer analog output. At the end of the temperature excursion, the computer has a set of address and data pairs which are used to program a PROM for that particular transducer. The programmed PROM is then installed in the transducer which thereafter functions independently of the computer. This method corrects for all sensor, mechanical and electronic thermal errors as an integral system.

BRIEF DESCRIPTION OF THE DRAWINGS

The foregoing and other objects, aspects and advantages of the invention will be better understood from the following detailed description of a preferred embodiment with reference to the drawings, in which.

DETAILED DESCRIPTION OF THE PREFERRED EMBODIMENT OF THE INVENTION

Figure 1:
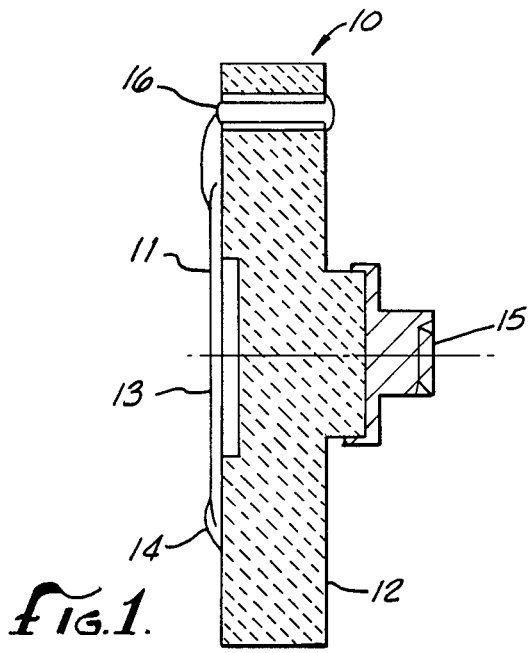
FIG. 1 is a cross-sectional view of the pressure sensor used in the present invention.

In the drawings, identical reference numerals in the several figures indicate the same or like parts. Referring now to the drawings, and more particularly to FIG. 1, there is shown in cross-section a typical pressure sensor 10 which is used in the practice of the invention. The active sensing element is a sapphire diaphragm 11 that has an epitaxially grown silicon layer (not shown) on one surface. The silicon layer is selectively etched to produce four stress and one temperature sensitive resistors on the surface. The electrical connections of these resistors are described in detail with reference to FIGS. 2 and 3 hereinafter. Two of the resistors are orientated in a crystallographic direction that produces an increase in resistance with an increase in stress. The other two of the stress sensitive resistors are orientated at 90 degrees to the first two. These two resistors produce a decrease in resistance with an increase in stress. The four stress sensitive resistors are connected in a Wheatstone bridge configuration to produce an output proportional to the diaphragm surface stress and pressure. Two taps are provided on two of the four bridge resistors to permit balancing of the bridge output voltage at zero input pressure by selection of an external resistor ratio. Improved thermal stability is achieved by this closed bridge zero balance technique by eliminating the effect that external trim resistors would have if placed in series with the bridge resistors. A typical output of 50 millivolts is produced by the sensor at full scale pressure with 10 VDC excitation. An additional silicon resistor is located on the diaphragm 11 in an orientation making it sensitive only to temperature. This silicon resistor has a large temperature coefficient (approximately 8%/100 degrees F.) and is used to provide an output proportional to temperature. The large temperature coefficient does not affect the pressure bridge output because all four resistors have the same temperature coefficient.

The sapphire diaphragm 11 is mounted to a base 12 made of alumina. A glass, with the same thermal expansion coefficient as the alumina base 12 and sapphire diaphragm 11, is used to join the diaphragm and base together. This forms a high strength hermetic joint. A cavity 13 formed in the alumina base 12 defines the active area of the pressure sensing diaphragm 11. For absolute pressure transducers, this cavity is sealed during the process of attaching the diaphragm to the base. For differential pressure transducers, a low pressure input pressure is applied to the cavity to act on the underside of the sapphire diaphragm. This produces a device sensitive to the difference between the high and low pressures applied to opposite sides of the diaphragm.

Aluminum conductors run from the silicon strain gauge bridge resistors to the outer edge of the sapphire diaphragm. Wire bonding is used to attach aluminum wire 14 between the aluminum pads on the sapphire diaphragm 11 and the terminal pins 16. The diaphragm/base assembly is attached to a mounting tube assembly 15, made of Kovar to match the thermal expansion of the alumina and stainless steel. The attachment is made by using a glass frit with a temperature coefficient matching the alumina and Kovar. The tube 15 is used to provide mechanical mounting of the sensor assembly into a pressure housing. Pressure applied to the surface of the sapphire diaphragm 11 deflects the diaphragm and causes a change in stress in the area of the silicon strain gauge bridge resistors. This produces a change in resistance of the bridge resistors and results in a millivolt output which can be amplified by suitable electronics.

The total pressure instrument assembly consists of a transducer assembly and an electronics assembly. The pressure sensor shown in FIG. 1 can be used in either an absolute or differential pressure transducer assembly. Both assemblies consist of the sensor assembly 10 shown in FIG. 1 mounted in a silicone fluid filled pressure housing.

Figure 2:
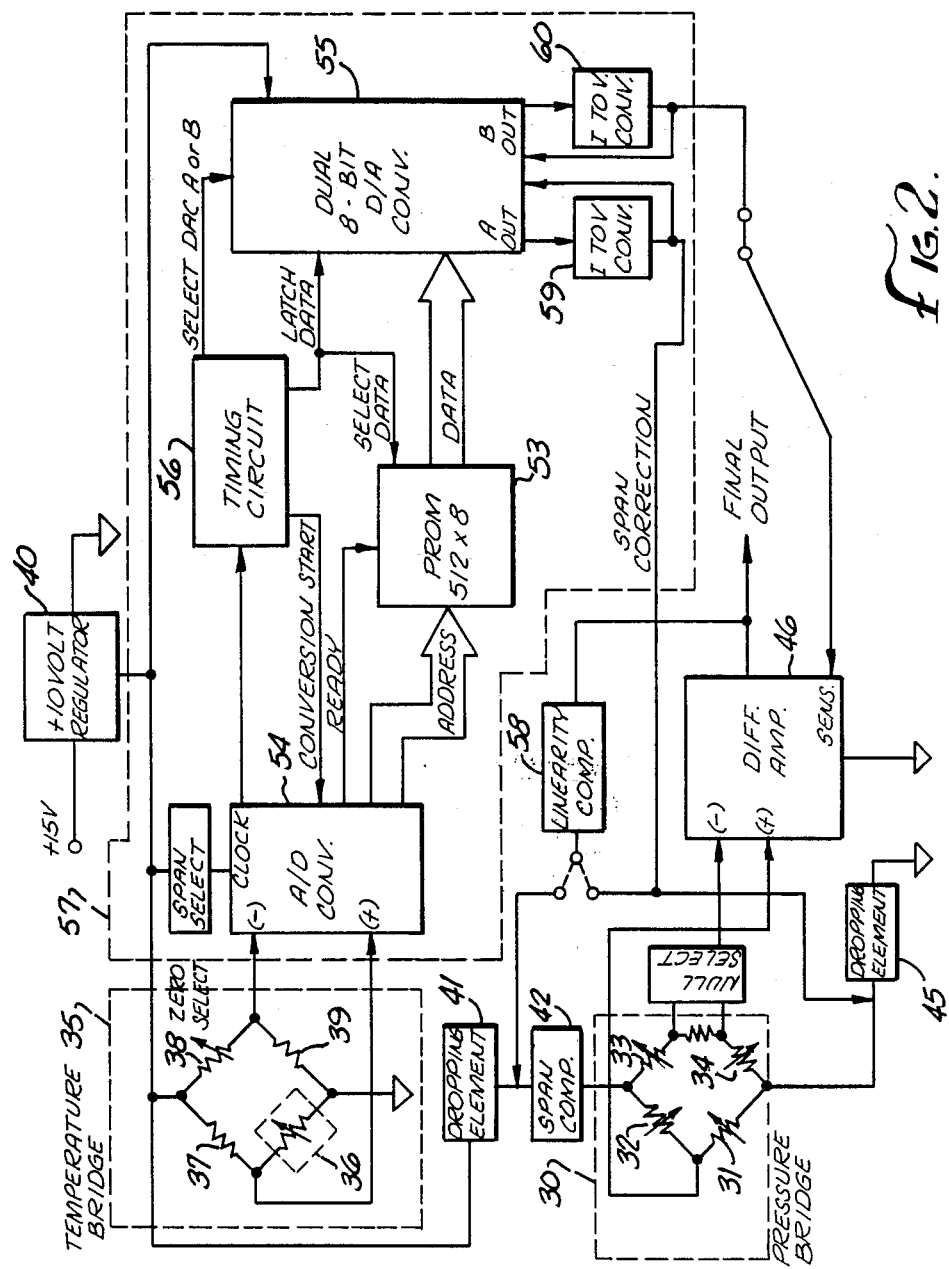
FIG. 2 is a block diagram of the error correction circuitry according to the present invention.
Figure 3:
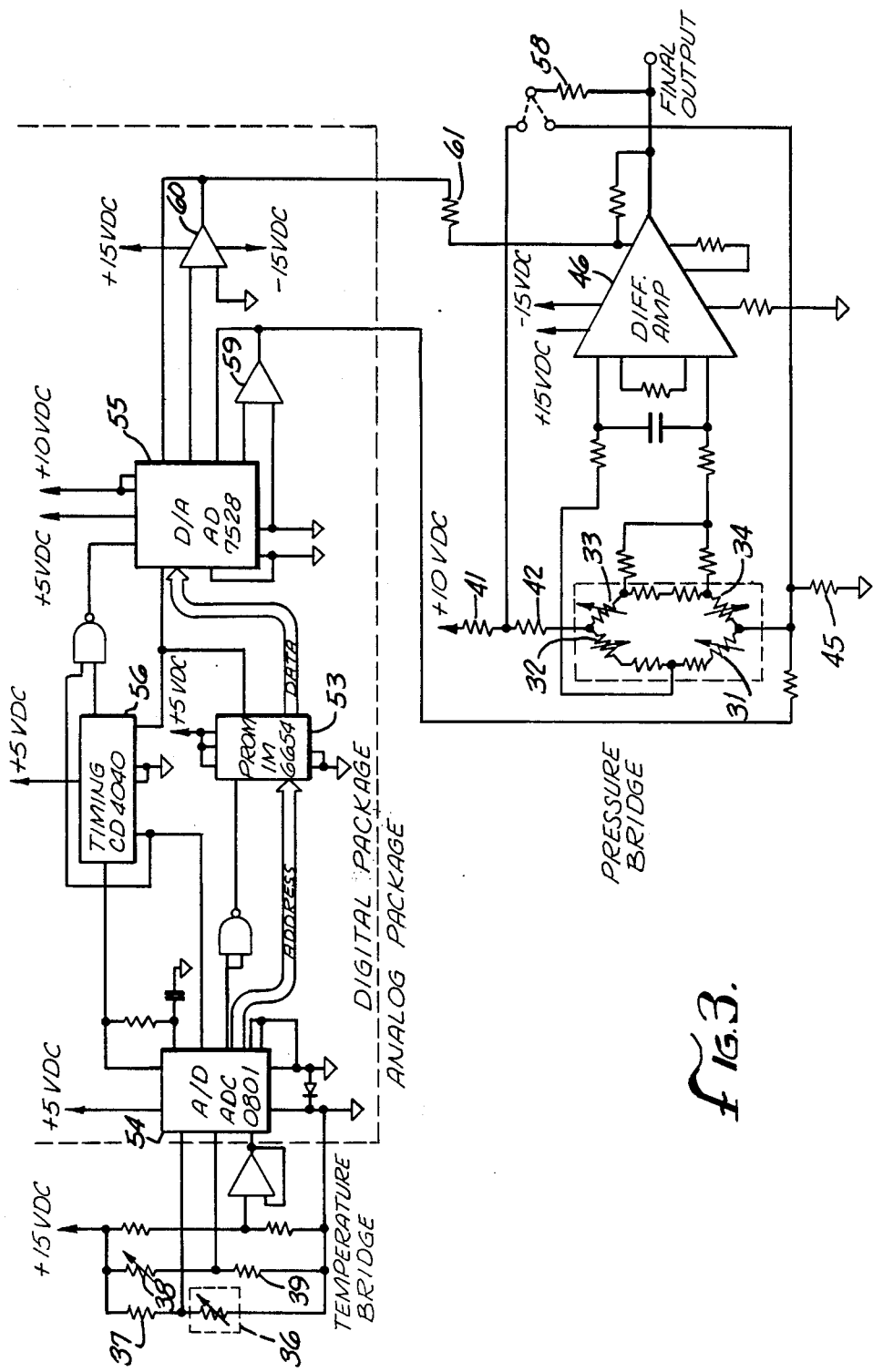
FIG. 3 is a schematic circuit diagram of the error correction circuitry illustrated in block diagram form in FIG. 2.

The electronics assembly required to provide an analog pressure signal with integral digital correction is shown in block diagram form in FIG. 2 and, in more detail, in the schematic diagram of FIG. 3. The pressure bridge 30 comprises the four stress sensitive piezoresistors 31, 32, 33, and 34 on the sapphire diaphragm 11 connected in a Wheatstone bridge. The pressure bridge null voltage (zero pressure output) is initially presented as roughly +50 mVDC and −50 mVDC at the two null select bridge taps. Selection of the off bridge null select resistor ratio subsequently trims the bridge null to ±0.3% of full scale. This remaining setting error is removed by the digital error correction circuit. The temperature bridge 35 comprises resistors 36, 37, 38, and 39. One of these resistors, resistor 36, is the temperature sensitive resistor and is epitaxially deposited on the sapphire diaphragm 11 with an orientation that makes it essentially stress insensitive. The remaining three resistors 37, 38 and 39 are temperature stable resistors located off the sapphire diaphragm 11. One of these, resistor 38, is adjustable to calibrate the bridge. The output of bridge 35 is directly proportional to temperature.

The bridge circuits 30 and 35 are excited by a voltage regulator 40 which provides the input power for the analog portion of the circuit. The voltage regulator 40 receives a +15 VDC input and provides a +10 VDC precision regulated output. Power is supplied to the pressure bridge 30 through two series resistors 41 and 42 (low temperature coefficient) driven by the voltage regulator 40. One of these, resistor 41, is a voltage dropping resistor and the other, resistor 42, is used as the input resistance for the linear compensation voltage from linear compensation circuit 58. The values of these series resistors are chosen to achieve passive compensation of the bridge thermal span shift to within ±2% of full scale. The pressure bridge 30 is connected to ground through voltage dropping resistor 45. The span correction signal, described in more detail hereinafter, is applied across resistor 45.

The pressure bridge 30 provides a differential voltage which is proportional to the applied pressure. The bridge voltage is amplified by an instrumentation amplifier 46. This circuit rejects common mode voltages. The input of instumentation amplifier 46 is connected to achieve a low pass filtering of the pressure bridge output signals.

The programmable read only memory (PROM) 53 and the associated A/D converter 54, D/A converter 55, and timing control circuit 56 comprise a digital error correction circuit 57 which corrects for systematic transducer errors. The thermal zero and span shifts are corrected using data stored in the PROM 53. More specifically, PROM 53 contains both zero and span correction data corresponding to temperatures from, for example, −65 to +250 degrees Fahrenheit in approximately 1.25 degree increments. The linearity error is corrected by a simple analog circuit 58 which modifies the voltage drive to the pressure sensing bridge as a function of output of instrumentation amplifier 46.

The A/D converter 54 converts the temperature bridge 35 output to an 8-bit digital signal. This 8-bit digital signal is connected to the address lines of the PROM 53, and the address is latched in the PROM when the conversion process is complete as indicated by a signal on the interrupt line. See the timing diagram in FIG. 4. The PROM has two data outputs for each address. One data output is the span correction data and the other is the zero correction data. The data output is selected by the timing control circuit 56. The latched address causes the selected data to read out of the PROM 53 to the 8-bit D/A converter 55. This converter has two outputs which are selected by the timing control circuit 56. Output A provides an analog correction signal which is summed with the pressure signal at the instrumentation amplifier 46 output for thermal zero correction, and output B provides a second analog correction signal used to change the voltage drive to the pressure sensing bridge 30 for thermal span shift correction. The timing circuit 56 controls the exchange of information between the A/D converter 54, the PROM 53 and the D/A converter 55. The timing control circuit 56 alternately directs the converted PROM output to side A of the D/A converter (thermal span correction) or to side B (thermal zero shift correction). Each correction is made approximately fifty times per second. The outputs from the D/A converter 55 are currents which must be converted to voltages for use in making the thermal zero and span shift compensations. For this purpose, current-to-voltage converters 59 and 60 are respectively connected to outputs A and B of the D/A converter 55. These converters are implemented with amplifiers which provide a constant voltage output between changes in output selections by the timing control circuit 56. The output of converter 59 is connected to dropping resistor 45 to provide thermal span compensation by modifying the voltage across the pressure bridge 30. The output of converter 60 is connected to the instrumentation amplifier 46 output summing junction via input resistor 61 (shown in FIG. 3) to provide thermal zero shift compensation by adding an offset signal to the sensing input of the instrumentation amplifier.

Figure 4:
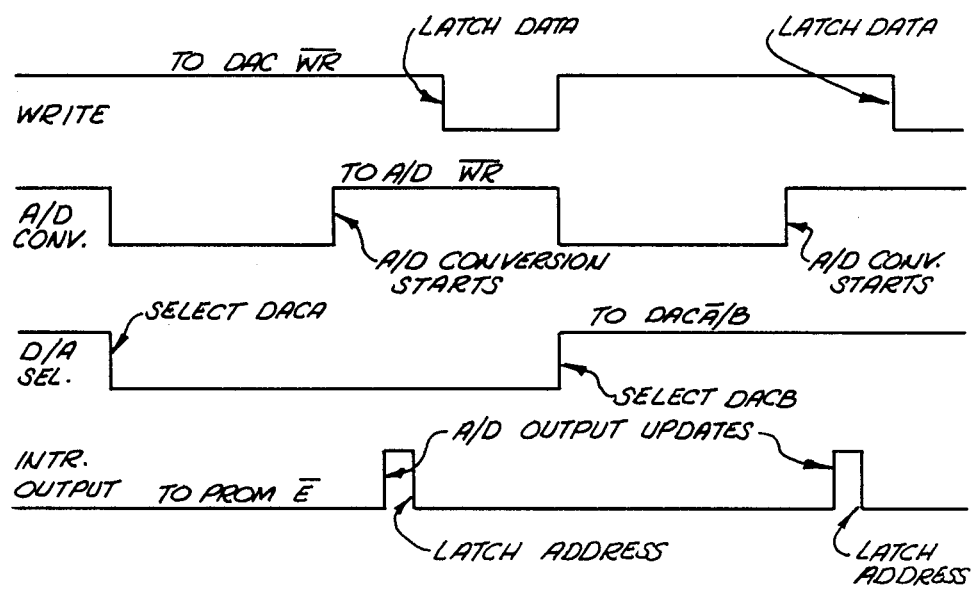
FIG. 4 is a timing diagram illustrating the operation of the digital correction circuit according to the invention.

In operation, the first step in updating the thermal zero or span correction is the selection of one of the PROM data bus outputs and the corresponding one of the D/A channels by the timing control circuit 56 as shown by the timing diagram in FIG. 4. The temperature of the silicon-on-sapphire bridge is sensed using the integral temperature sensor resistor 36 on the diaphragm 11 adjacent to the pressure bridge 30. The temperature sensor resistor 36, which is connected in a Wheatstone bridge, generates an output that is connected to the input of 8-bit A/D converter 54. The A/D converter 54 receives a start conversion command from the timing control circuit 56. An 8-bit binary number between 0 and 255 will then be generated by the A/D converter 54 corresponding to the sensor temperature between −65 and 250 degrees Fahrenheit. The high and low temperature limits for this conversion are established by span and zero select resistors at the temperature sensing bridge 35. Upon completion of the A/D conversion, an interrupt or data ready signal is generated by the converter. The data ready signal is inverted to assure proper latch and hold of the PROM 53. The data ready signal applied to the PROM 53 causes the binary number to latch into the PROM address registers. For the specific example being described, the PROM has 512 bytes of storage, and each one of the 255 addresses input from the A/D converter is used to address two bytes of data, one byte being the span correction data and one byte being the zero correction data. The timing control circuit 56 alternately selects the span and zero correction data by applying high and low logic levels to the PROM 53 address line. The PROM 53 then presents these pre-programmed error correction numbers on the output data bus. The correction number is given time to set-up the D/A converter 55 by a write command from the timing control circuit 56. Latched correction numbers cause a steady state current to flow to the output current to voltage converter amplifiers 59 and 60. The D/A output current is controlled by a +10.000 VDC reference and a ground reference resulting in a 0 to −10 VDC output from the current to voltage converter amplifiers 59 and 60 corresponding to a 0 to 255, 8-bit binary number in the D/A converter 55 latch. The timing control circuit 56 will then select the alternate channel of the D/A converter 55 and begin the correction voltage update cycle again. Zero and span correction voltages are updated at least 25 times per second.

As will be appreciated, the invention has significant advantages over the prior art including the provision of a direct analog output which is digitally corrected without the need for a digital computer or microprocessor and without the synchronization problems ordinarily encountered with digitally corrected pressure transducers. In the implementation of the preferred embodiment, the PROM of each transducer is separately programmed in the factory calibration of the transducer. In calibrating a transducer, the PROM 53 is replaced with a ROM simulator which is computer controlled. The transducer circuit is activated with a precision pressure source connected to the transducer. The temperature is slowly changed from one exterme to another and, as the temperature sensing resistor, through the differential A/D converter 54, addresses each new ROM correction, the computer responds with a successive approximation of simulated ROM outputs until the ideal null and span correction numbers are achieved as measured at the transducer analog output. At the end of the temperature excursion, the computer has a set of address and data pairs which are used to program the PROM 53 for that particular transducer. This method corrects for all sensor mechanical and electronic thermal errors as an integral system.

The invention is particularly useful in providing temperature compensation in silicon-on-sapphire pressure transducers, but the techniques involved may have application to other types of transducer requiring temperature compensation, such as transducers using thin-film, diffused silicon, or bonded silicon or foil strain gages. Thus, while the invention has been disclosed in terms of a preferred embodiment, those skilled in the art will recognize that the invention can be practiced with modification and variation within the scope and spirit of the appended claims.

Having thus described our invention, what we claim to be novel and desire to secure by Letters Patent is as follows:

1. A pressure transducer with integral digital compensation comprising:
   a pressure sensor assembly including a temperature sensitive element;
   an analog signal conditioning circuit connected to said temperature sensitive element, said circuit providing an output proportional to the temperature of said pressure sensor;
   an analog-to-digital converter connected to receive the output of said analog signal conditioning circuit and providing a digital output signal;
   a read only memory having address lines and a data bus, said address lines being connected to receive said digital output signal from said analog-to-digital converter, and said read only memory being pre-programmed to selectively provide thermal span shift or thermal zero shift correction data on said data bus in response to said digital output signal;
   a digital-to-analog converter having an input connected to the data bus of said read only memory and two selectable outputs, said digital-to-analog converter providing an analog signal output to a selected one of said two outputs corresponding to a correction number on said data bus of said read only memory, one of said two outputs being connected to said pressure sensor assembly to provide a thermal span shift compensation;
   timing control means connected to said analog-to-digital converter, to said read only memory, and to said digital-to-analog converter for controlling the sampling of the output signal from said analog conditioning circuit by said analog-to-digital converter and for alternately selecting thermal span shift or zero shift data from said read only memory and one or the other of the two outputs of said digital-to-analog converter; and
   amplifier means connected to said pressure sensor assembly for amplifying an output voltage from said assembly, the other of said two outputs of said digital-to-analog converter being connected to said amplifier means to modify the amplified voltage from said pressure sensor assembly to compensate for thermal zero shift.

2. The pressure transducer as recited in claim 1 wherein said read only memory is a programmable read only memory which is programmed with span shift and zero shift data generated at the time the transducer is calibrated.

3. The pressure transducer as recited in claim 1 wherein said pressure sensor assembly comprises:
   a pressure-responsive diaphragm with silicon piezoresistive strain gauges deposited thereon, said temperature sensitive element being a temperature responsive resistive element deposited on said diaphragm and said pressure-sensitive strain gauges being electrically connected in a bridge circuit;

said temperature sensitive element providing an output proportional to the temperature of said piezoresistive strain gauges on said diaphragm;

one of said two outputs of said digital-to-analog converter being connected to said bridge circuit comprising said piezoresistive strain gauges to provide a thermal span shift compensation; and said amplifier having an input connected to said bridge circuit comprising said piezoresistive strain gauges for amplifying a differential voltage across said bridge circuit.

4. The pressure transducer as recited in claim 3 wherein said pressure sensor assembly further comprises:

a base member supporting said pressure-sensitive diaphragm, said base member having a cavity covered by said pressure-sensitive diaphragm; and a hermetically sealed housing enclosing said pressure-sensitive diaphragm and base member.

5. The pressure transducer recited in claim 4 wherein said pressure sensor assembly is an absolute pressure sensing device, the cavity in said base member containing a fluid at a predetermined pressure.

6. The pressure transducer as recited in claim 4 wherein said pressure sensor assembly is a differential pressure sensing device, said housing including a port communicating with said cavity in said base member.

7. The method of calibrating a pressure transducer of the type comprising a pressure sensor assembly including a pressure-responsive diaphragm with silicon piezoresistive strain gauges deposited thereon and electrically connected in a bridge circuit and a temperature sensitive element deposited thereon, an analog-to-digital converter responsive to said temperature sensitive element for providing a digital output signal, a programmable read only memory having address lines and a data bus, said address lines being connected to receive the digital output signal from said analog-to-digital converter to selectively provide thermal span shift or thermal zero shift correction data on said data bus in response to said digital output signal, a digital-to-analog converter having an input connected to the data bus of said programmable read only memory and two selectable outputs, one of said outputs being connected to said bridge circuit to provide thermal span shift compensation, timing control means connected to said analog-to-digital converter, said programmable read only memory, and said digital-to-analog converter for controlling the sampling of the output from said temperature sensitive element and the selecting data from said programmable read only memory and the selecting one or the other of the two outputs from said digital-to-analog converter, and amplifier means connected to said bridge circuit for amplifying a differential voltage across said bridge circuit, the other of said two outputs of said digital-to-analog converter being connected to said amplifier means to modify the amplified voltage from said bridge circuit to compensate for thermal zero shift, said method comprising the steps of:

replacing said programmable read only memory with a digital computer programmed to generate thermal span shift and thermal zero shift data;

connecting said transducer to a precision pressure source;

changing the temperature of said transducer over a range of temperatures;

for each digital output from said analog-to-digital converter for predetermined changes in temperature, generating thermal span shift and zero shift data with said digital computer so that ideal zero and span response are achieved as measured at the transducer analog output;

storing said generated thermal span shift and zero shift data with temperatures corresponding to said data; and programming said programmable read only memory with said stored thermal span shift and zero shift data;

inserting the programmed programmable read only memory into said pressure transducer.

8. A pressure transducer having sensing gauges comprising:

means on a common substrate with said pressure sensing gauges for sensing the temperature of said pressure sensing gauges and producing an analog temperature signal;

means for digitizing said analog temperature signal to provide a digitized temperature signal;

means addressed by said digitized temperature signal for providing first and second temperature correction digital signals;

means for converting said first and second temperature correction digital signals to first and second analog temperature correction signals;

means for applying said first analog temperature correction signal to said pressure sensing gauges as a span correction signal; and means for applying said second analog temperature correction signal to a pressure output signal produced by said pressure sensing gauges as a zero correction signal.

* * * * *